US007904274B2

United States Patent
Shimaoka et al.

(10) Patent No.: US 7,904,274 B2
(45) Date of Patent: Mar. 8, 2011

(54) MOBILE APPARATUS (75) Inventors: Shiro Shimaoka, Hamura (JP);
Kazuyuki Nagasawa, Hino (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 82 days.

(21) Appl. No.: 12/351,992

(22) Filed: Jan. 12, 2009

(65) Prior Publication Data
US 2009/0299691 A1 Dec. 3, 2009

(30) Foreign Application Priority Data

Jun. 3, 2008 (JP) ................................ P2008-145389

(51) Int. Cl.
*G01C 22/00* (2006.01)
(52) U.S. Cl. ........................................................ 702/160
(58) Field of Classification Search .................. 702/141, 702/142, 152, 160; 600/509, 520; 482/4; 455/67.11; 73/495
See application file for complete search history.

(56) References Cited

U.S. PATENT DOCUMENTS
2010/0057397 A1* 3/2010 Takeishi et al. ............... 702/160

FOREIGN PATENT DOCUMENTS
JP 2006-101215 A 4/2006
* cited by examiner

*Primary Examiner* — John H Le
(74) *Attorney, Agent, or Firm* — Maschoff Gilmore & Israelsen (57) ABSTRACT

According to one aspect of the invention, there is provided a mobile apparatus including: a vibration sensor; an acquisition module configured to periodically acquire the number of vibration in a time period as a detected step count value; a first determination module configured to determine whether there is a possibility that the detected step count value is due to walking or running based on the detected step count value; and a calculation module configured to count the detected step count value as an interim step count. The first determination module determines the detected step count value is due to continuous walking or running of a user when the detected step count value satisfies a certain condition. The calculation module calculates total of the interim step count when the first determination module determines the detected step count value is due to the continuous walking or running.

15 Claims, 8 Drawing Sheets

MOBILE APPARATUS

The entire disclosure of Japanese Patent Application No. 2008-145389 filed on Jun. 3, 2008, including specification, claims, drawings and abstract is incorporated herein by reference in its entirety.

BACKGROUND

1. Field of the Invention

The present invention relates to a mobile apparatus equipped with a pedometer function capable of obtaining an accurate value of the number of steps by extracting only regular vibrations due to user's continuous walking/running from vibrations detected by a sensor.

2. Description of the Related Art

Reduction in size and weight of various mobile apparatuses such as a mobile phone, a game machine, an audio player, etc. has been attained in recent years, so that users have been able to always carry these mobile apparatuses with them On the other hand, a mobile phone is provided with various functions such as a mailing function, a Web browsing function, a game function, a television function, etc. With the advance of functional preparedness in the mobile phone, the mobile phone is necessary for users. However, because the aforementioned functions of the mobile phone were additional functions, it was necessary for the user to carry a plurality of mobile apparatuses at once when the user is not satisfied with these functions or when the user wanted to use a function not provided in the mobile phone. Carrying such a plurality of mobile apparatuses at the same time may be troublesome to the user.

Therefore, a mobile phone equipped with a function of a pedometer which had to be heretofore carried as a single device has been proposed (see JP-A-2006-101215). This mobile phone is equipped with a pedometer in addition to a common mobile phone. This mobile phone measures a value of the number of steps the user walked and stores the measured value in a memory, so that the mobile phone can display a walked distance by multiplying the measured value and a set average step length. Moreover, the mobile phone can give an alarm noise to the user when the measured value of the number of steps coincides with a set target value. In addition, the mobile phone can temporarily interrupt counting of the number of steps so that the mobile phone can perform continuous measurement by reading the value of the number of steps stored in the memory to resume the measurement of the walked distance.

In the mobile apparatus equipped with a pedometer function, the number of steps might be miscounted because of vibration of the mobile apparatus caused by other factors than user's walking/running, that is, speaker's vibration based on the audio playback function, vibration based on the game function used by a user, vibration based on a user's key operation, vibration based on user's movement (getting on a train or bus, changing user's posture, etc.) other than walking/running, etc. Moreover, since the pedometer function of the mobile apparatus must be always activated even when the original function (such as a communication function, etc.) of the mobile apparatus is not used, it is desired that power saving of the mobile apparatus is attained, for example, by reduction in frequency of access to the vibration sensor counting the number of steps when the mobile apparatus is not operated by the user (e.g. the mobile apparatus is in a sleep state).

SUMMARY

According to one aspect of the invention, there is provided a mobile apparatus including: a vibration sensor; an acquisition module configured to periodically acquire the number of vibration in the vibration sensor in a time period as a detected step count value; a first determination module configured to determine whether there is a possibility that the detected step count value is due to walking or running based on the detected step count value; and a calculation module configured to count the detected step count value as an interim step count; wherein the first determination module determines that the detected step count value is due to continuous walking or running of a user when the detected step count value satisfies a certain condition; and wherein the calculation module calculates total of the interim step count when the first determination module determines that the detected step count value is due to the continuous walking or running.

BRIEF DESCRIPTION OF THE DRAWINGS

Embodiment may be described in detail with reference to the accompanying drawings, in which.

DETAILED DESCRIPTION OF THE EMBODIMENTS

Figure 1A:
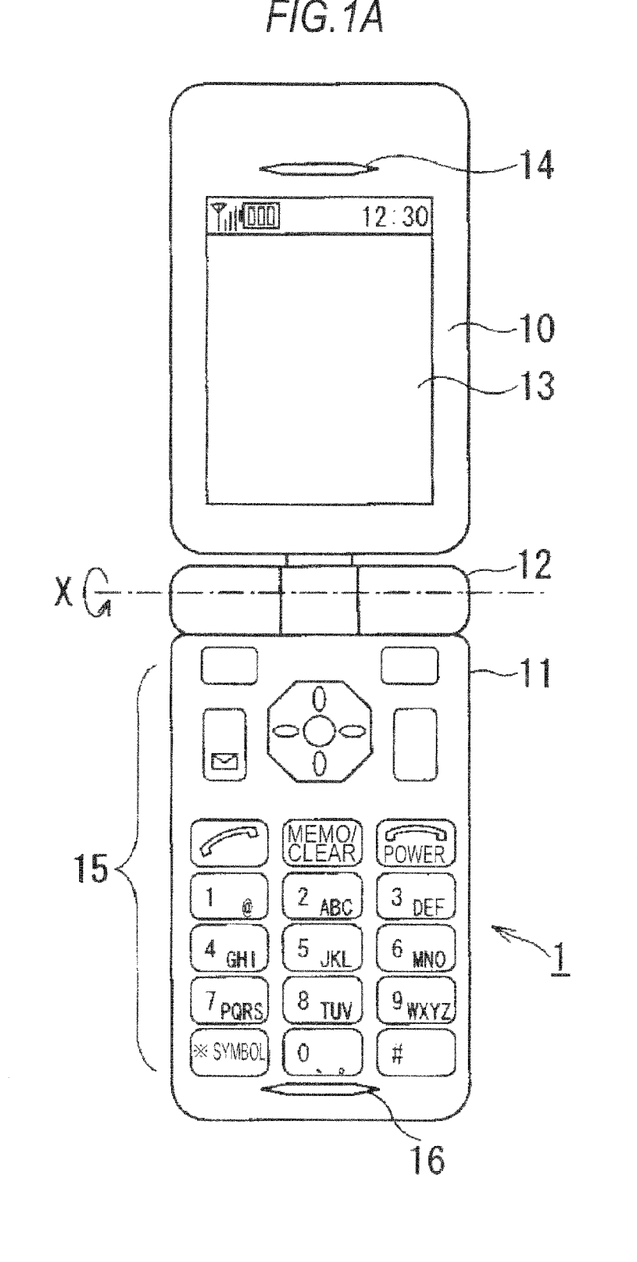
FIG. 1A is an exemplary front view showing a state where a mobile apparatus (mobile phone) according to the invention is unfolded.
Figure 1B:
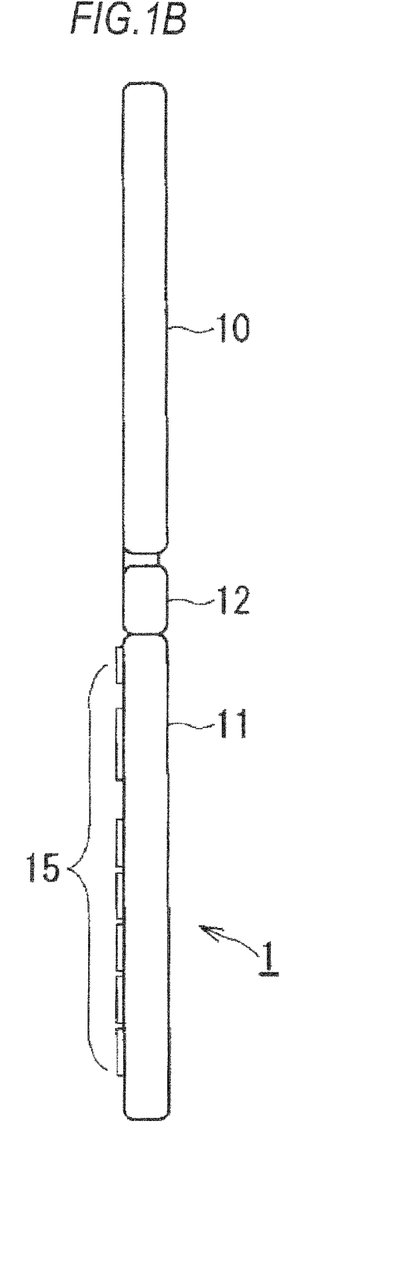
FIG. 1B is an exemplary side view showing a state where the mobile apparatus (mobile phone) is unfolded.
Figure 2A:
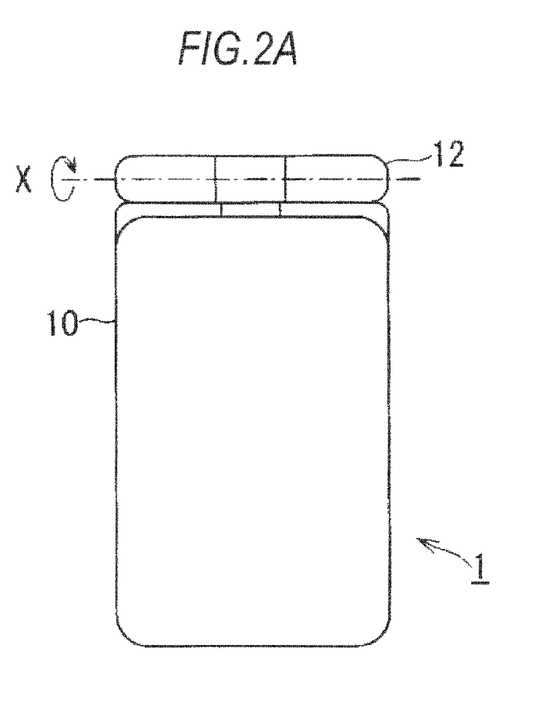
FIG. 2A is an exemplary front view showing a state where the mobile apparatus (mobile phone) is folded.
Figure 2B:
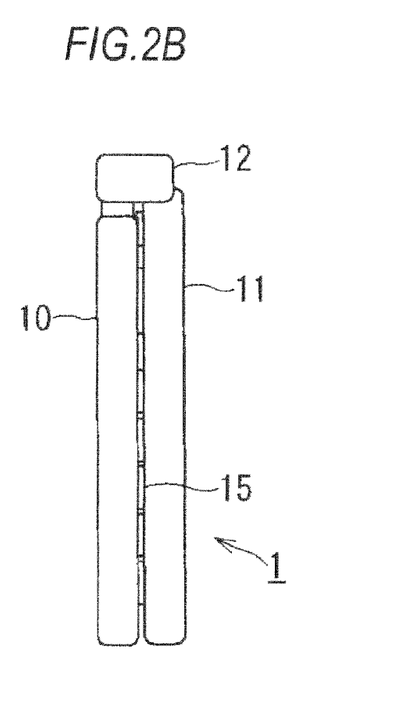
FIG. 2B is an exemplary side view showing a state where the mobile apparatus (mobile phone) is folded.

An embodiment of a mobile apparatus according to the present invention will be described with reference to the accompanying drawings. Description will be made on the case where a clamshell type mobile phone 1 having a plurality of casings integrated into one capable of being folded and unfolded is taken as an example of the mobile apparatus according to the invention. FIG. 1A is a front view showing an unfolded state of the mobile phone 1. FIG. 1B is a side view showing the unfolded state of the mobile phone 1. FIG. 2A is a front view showing a folded state of the mobile phone 1. FIG. 2B is a side view showing the folded state of the mobile phone 1.

As shown in FIGS. 1A, 1B, 2A and 2B, the mobile phone 1 mainly has an upper casing 10 shaped like a rectangular plate, and a lower casing 11 of almost the same shape as the upper casing 10. In the folded state of the mobile phone 1, the upper and lower casings 10 and 11 are stacked so that one mobile phone of one of the upper and lower casings 10 and 11 is covered with one mobile phone of the other casing. The upper and lower casings 10 and 11 are hinge-connected to each other through a hinge portion 12 disposed between the upper and lower casings 10 and 11. The upper and lower casings 10 and 11 are formed so that the upper casing 10 can rotate on the hinge portion 12 by an angle in an X direction in FIGS. 1A, 1B, 2A and 2B with respect to the lower casing 11. The state of the mobile phone 1 is changed from the folded state to the unfolded state or from the unfolded state to the folded state by rotation of the upper casing 10 with respect to the lower casing 11.

A display 13 and a speaker 14 are provided in an inner mobile phone of the upper casing 10 (i.e. a mobile phone on a side facing the lower casing 11). Display information including characters, images, etc. is displayed on the display 13. Voice received from a calling party is output from the speaker 14. In the folded state of the mobile phone 1, the display 13 and the speaker 14 are not exposed to the outside because they are covered with the lower casing 11. When the state of the mobile phone 1 is changed to the unfolded state by rotation of the upper casing 10 relative to the lower casing 11, the display 13 and the speaker 14 are exposed to the outside.

An operation keypad 15 is provided in an inner mobile phone of the lower casing 11 (i.e. a mobile phone on a side facing the upper casing 10). For example, the operation keypad 15 has a power key for powering on/off the mobile phone 1, a calling key for initiating a calling process, numeric keys for inputting digits and characters, and short-cut keys for initiating a mail function and a Web function. A microphone 16 for collecting voice is further provided in the lower casing 11. In the folded state of the mobile phone 1, the operation keypad 15 and the microphone 16 are not exposed to the outside because they are covered with the upper casing 10. When the state of the mobile phone 1 is changed to the unfolded state by rotation of the upper casing 10 relative to the lower casing 11, the operation keypad 15 and the microphone 16 are exposed to the outside.

A connector 17 for connecting an AC adapter to the mobile phone 1 is provided in a side mobile phone of the lower casing 11. When the AC adapter is attached to the connector 17, electric power is supplied from this AC adapter to a power supply source (such as a battery) included in the mobile phone 1. The connector 17 is exposed to the outside regardless of whether the mobile phone 1 is folded or unfolded. Accordingly, a user can connect the AC adapter to the connector 17 at any time to charge the mobile phone 1 electrically.

Figure 3:
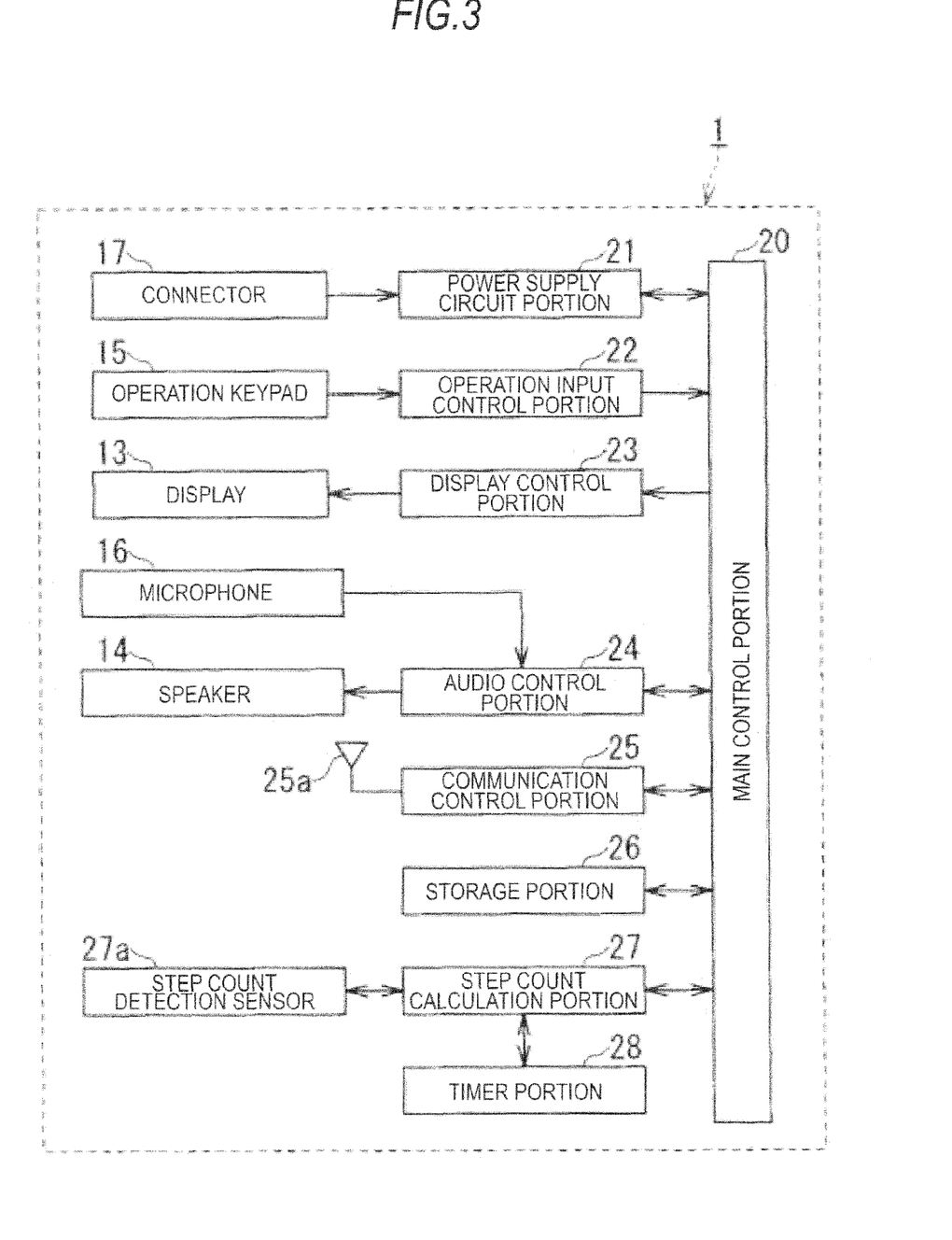
FIG. 3 is an exemplary functional block diagram of the mobile apparatus (mobile phone)

The function of the mobile phone 1 will be described next with reference to FIG. 3 which is a functional block diagram of the mobile phone 1. As shown in FIG. 3, the mobile phone 1 has a main control portion 20, a power supply circuit portion 21, an operation input control portion 22, a display control portion 23, a audio control portion 24, a communication control portion 25, and a storage portion 26. These portions 20 to 26 are connected to one another by a bus so that they can communicate with one another.

The main control portion 20 has a Central Processing Unit (CPU) The main control portion 20 collectively controls the mobile phone land performs a step count display control process and other various arithmetic operation processes and control processes which will be described later. The power supply circuit portion 21 has an input interface, for example, for the power key. When user's pressing the power key is detected, the power supply circuit portion 21 generates a signal for indicating the detection of the pressed power key and transmits the signal to the main control portion 20. The power supply circuit portion 21 further has a power supply source (such as a battery) The power supply circuit portion 21 switches the power-on/off state of the mobile phone 1 based on an input through the power key, so that the power supply source supplies electric power to the respective portions in the power-on state to make the mobile phone 1 operable.

The operation input control portion 22 has an input interface for the operation keypad 15. When any key pressed in the operation keypad 15 is detected, the operation input control portion 22 generates a signal for indicating the pressed key in the operation keypad 15 and transmits the signal to the main control portion 20. The display control portion 23 has a display interface for the display 13. The display control portion 23 displays document data, image data, etc. on the display 13 under the control of the main control portion 20.

The audio control portion 24 generates an analog voice signal from voice collected by the microphone 16 and converts the analog voice signal into a digital voice signal under the control of the main control portion 20. When the digital voice signal is acquired, the audio control portion 24 further converts the digital voice signal into an analog voice signal under the control of the main control portion 20 so that the analog voice signal is output as voice from the speaker 14.

The communication control portion 25 restores data to its original state by applying a spectrum despreading process to a reception signal received from a base station through an antenna 25a under the control of the main control portion 20. The data is transmitted to the audio control portion 24 so as to be output from the speaker 14 or is transmitted to the display control portion 23 so as to be displayed on the display 13 or is recorded on the storage portion 26, based on a command given from the main control portion 20. When voice data collected by the microphone 16, data input through the operation keypad 15 or data stored in the storage portion 26 is acquired under the control of the main control portion 20, the communication control portion 25 applies a spectrum spreading process to the data and transmits the processed data to the base station through the antenna 25a.

The storage portion 26 has a Read Only Memory (ROM), a hard disk, a nonvolatile memory or a database for storing processing programs for processing performed by the main control portion 20 and data necessary for the processing, and a Random Access Memory (RAM) for temporarily storing data used for the processing performed by the main control portion 20. For example, a processing program used when the main control portion 20 performs a step count display control process which will be described later and a processing program used when a step count calculation portion 27 performs a step count calculation process which will be described later are stored in the ROM.

The step count calculation portion 27 has a step count detection sensor 27a which detects vibration of the mobile phone 1. For example, the step count detection sensor 27a is an acceleration sensor. The accumulated number of vibrations is stored inside of the step count detection sensor 27a, so that when acceleration acting on the mobile phone 1 changes by an amplitude of not smaller than a threshold value, the step count detection sensor 27a regards a vibration as occurring and adds 1 to the accumulated number of vibrations Further, in order to start a timer to generate a turning point for acquiring a detected value of the number of steps from the step count detection sensor 27a, the step count calculation portion 27 transmits a timer start signal to a timer portion 28 to thereby instruct the timer portion 28 to start the timer. When a timer end signal is then received from the timer portion 28, the step count calculation portion 27 acquires the detected value of the number of steps from the step count detection sensor 27a and obtains a calculated value of the number of steps based on the detected value of the number of steps.

Upon reception of a signal for requesting the calculated value of the number of steps (calculated value request signal c) from the main control portion 20, the step count calculation portion 27 transmits a signal indicating the calculated value d of the number of steps to the main control portion 20. Upon reception of the calculated value d of the number of steps from the step count calculation portion 27, the main control portion 20 presents the number of steps to the user, for example, by displaying the number of steps on a display screen of the display 13.

The timer portion 28 starts time measurement based on reception of the timer start signal from the step count calculation portion 27 and generates a timer end signal to transmit the timer end signal to the step count calculation portion 27 based on the passage of a time. The time may be contained in the timer start signal or may be stored in the timer portion 28 in accordance with designation in advance.

Figure 4:
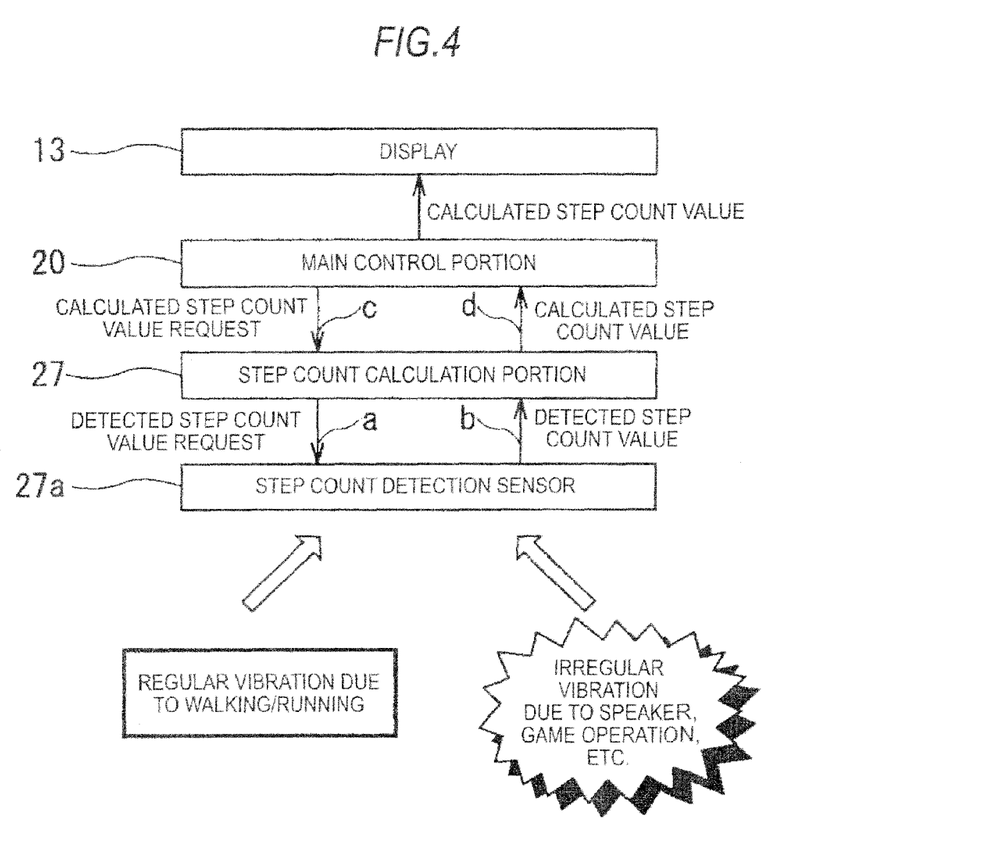
FIG. 4 is an exemplary view for explaining a step count calculation process in the mobile apparatus (mobile phone)

As shown in FIG. 4, the mobile phone 1 has a pedometer function provided as a combination of the step count detection sensor 27a and the step count calculation portion 27. The step count detection sensor 27a detects vibration of the mobile phone 1. The step count calculation portion 27 calculates the number of steps accurately by extracting vibration due to user's walking or running from the detected vibration.

Although it is ideal that the number of steps due to user's walking or running is detected accurately by the step count detection sensor 27a, there is a possibility that the number of steps actually detected by the step count detection sensor 27a may include irregular vibrations such as vibration due to the speaker, vibration due to user's key operation or game operation, and vibration due to user's movement other than user's walking or running in addition to regular vibrations due to user's walking or running because the mobile phone 1 is always carried with the user. In order to specify the number of steps due to user's walling or running accurately, it is therefore necessary to remove the irregular vibrations as noise from the detected value of the number of steps detected by the step count detection sensor 27a.

When the user is walking or running continuously while carrying the mobile phone 1, vibrations detected by the step count detection sensor 27a are regular to some degree because the mobile phone 1 vibrates at regular intervals. On the other hand, vibrations due to audio playback in the mobile phone 1, user's key operation or game operation and user's movement (such as getting on a train or a bus, changing user's posture, etc.) other than user's walking or running are irregular in many cases.

Therefore, the mobile phone 1 calculates a difference (range) between the previous number of steps per the number of seconds and the current number of steps per the same number of seconds whenever the mobile phone 1 acquires a value of the number of steps from the step count detection sensor 27a. When a state that the difference was not larger than a threshold value (within the threshold range) continued, the mobile phone 1 regards vibrations as being regular, determines that the vibrations were obtained from user's continuous walking or running, and subjects the vibrations to counting of the number of steps. When the amplitude was larger than the predetermined value (within the threshold range), the mobile phone 1 regards vibrations as being irregular, determines that the vibrations were not obtained from user's continuous walking or running, and precludes the vibrations from counting of the number of steps.

The step count calculation portion 27 periodically acquires the detected value of the number of steps detected by the step count detection sensor 27a. However, when the mobile phone 1 is in a CPU sleep state (a state that the CPU is set in a power saving mode), the frequency of access to the step count calculation portion 27 is reduced to attain power saving of the mobile phone 1. Specifically, parameters (the number of samples and the threshold range) for determining whether or not the user is continuously walling/running are set dynamically according to whether the mobile phone 1 is in a sleep state or in a non-sleep state.

The step count calculation portion 27 sends a detected step count value request signal a to the step count detection sensor 27a when the step count calculation portion 27 wants to acquire a detected step count value. Upon reception of the detected step count value request signal a from the step count calculation portion 27, the step count detection sensor 27a sends a detected step count value b to the step count calculation portion 27. The step count calculation portion 27 calculates a calculated step count value by removing noise from the received detected step count value b.

The main control portion 20 sends a calculated step count request signal c to the step count calculation portion 27 when the main control portion 20 needs to acquire a calculated step count value. Upon reception of the calculated step count value request signal c from the main control portion 20, the step count calculation portion 27 sends a calculated step count value d to the main control portion 20. When the calculated step count value d is acquired, the main control portion 20 informs the user of the number of steps, for example, by displaying the calculated step count value on the display 13.

Figure 5:
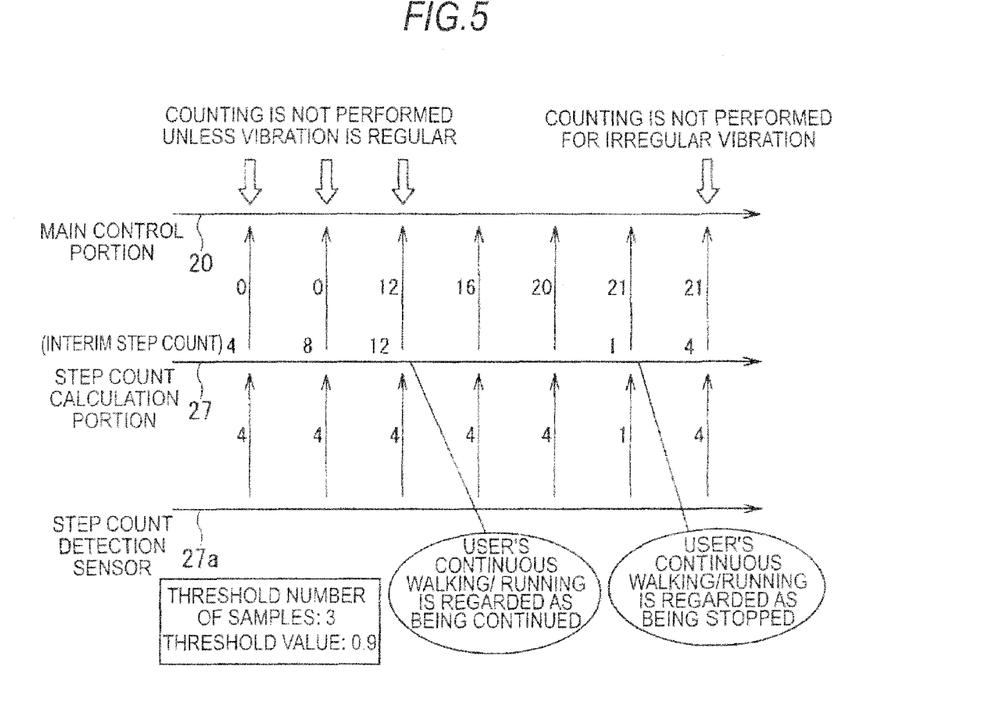
FIG. 5 is a view for explaining an example of a step count calculation method in the mobile apparatus (mobile phone)

A specific example of the step count calculation method will be described below with reference to FIG. 5. As shown in FIG. 5, the step count calculation portion 27 sends a detected step count value request to the step count detection sensor 27a (periodically) at intervals of a predetermined elapsed time, so that the step count calculation portion 27 acquires a detected step count value from the step count detection sensor 27a periodically. Although the step count calculation portion 27 actually acquires an integrated value of vibration from the step count detection sensor 27a on this occasion, description will be made on the assumption that a difference added up from the previously acquired value is acquired as the detected step count value.

The step count calculation portion 27 acquires the detected step count value periodically and determines whether the difference (range) between the current detected step count value and the previous detected step count value is larger than a threshold value or not. When the detected step count value within the threshold range is continued by the number of times (the number of samples), the step count calculation portion 27 regards user's walking/running as being continued. When there is a possibility of user's continuous walking/running but it is not determined, the step count calculation portion 27 stores the detected step count value as an interim step count as long as the step count calculation portion 27 regards user's walking/running as possibly being continued. Then, the step count calculation portion 27 adds the stored interim step count to the total step count at a point of time when the step count calculation portion 27 determines user's walking/running as being continued.

For example, assume that the threshold number of samples is set at "3" and the threshold value is set at "0.9". Then, upon reception of a detected step count value "4" from the step count detection sensor 27a, the step count calculation portion 27 regards user's walking/running as being continued when the detected step count value in a range of 3.1 to 4.9 is continued by a number of times not smaller than "3" times which is the threshold number of samples because the threshold value is "0.9". Therefore, the step count calculation portion 27 determines the interim step count as follows. Upon reception of a detected step count value "4" from the step count detection sensor 27a, the step count calculation portion 27 sets the interim step count at "4". Upon further reception of a detected step count value "4" from the step count detection sensor 27a, the step count calculation portion 27 sets the interim step count at "8" in consideration of a possibility of user's continuous walking/running. Upon further reception of a detected step count value "4" again from the step count detection sensor 27a, the step count calculation portion 27 sets the interim step count at "12" in consideration of a possibility of user's continuous walking/running in the same manner as described above. At this point of time, reception of the detected step count value "4" has been continued by three times. Accordingly, the step count calculation portion 27 regards user's walking/running as being continued, and the interim step count "12" is added to the total step count. Upon further reception of a detected step count value "4", the step count calculation portion 27 sets the total step count at "16" by adding the detected step count value "4" on this occasion to the total step count "12".

Upon further continuous reception of a detected step count value "4" from the step count detection sensor 27a, the step count calculation portion 27 regards user's walking/running as being continued because the difference is not larger than the threshold value. In this manner, the step count calculation portion 27 adds up the total step count as "20" and "24" successively.

The step count calculation portion 27 sends the total step count to the main control portion 20. Accordingly, at a point of time before the step count calculation portion 27 regards user's walking/running as being continued, the step count calculation portion 27 sends the total step count "0" to the main control portion 20 because there is no detected step count value added to the total step count. While the step count calculation portion 27 regards user's walking/running as being continued, the step count calculation portion 27 sends the total step count as "16" and "20" successively to the main control portion 20.

When the step count calculation portion 27 then receives a detected step count value "1" from the step count detection sensor 27a, the step count calculation portion 27 regards user's continuous walking/running as being stopped because the difference is larger than the threshold value, that is, because the detected step count value is out of the range of 3.1 to 4.9. Accordingly, the step count calculation portion 27 sets the interim step count at "1" and adds the calculated step count value to the total step count to thereby set the total step count at "21". Unless the step count calculation portion 27 regards user's walking/running as being continued again, the step count calculation portion 27 does not add up the total step count but sends the total step count "21" to the main control portion 20 repeatedly.

Incidentally, the step count calculation portion 27 sets values of parameters such as total step count, interim step count, continuous walking/running flag, measurement start time, the number of samples, etc. and calculates the number of steps (step count) based on these parameters. Incidentally, the interim step count is the number of steps which is temporarily stored before user's walking/running is regarded as being continued. The continuous walking/running flag is a parameter which indicates whether user's walking/running is continued or not. When user's walking/running is regarded as being continued, the continuous walking/running flag is expressed as "TRUE". Otherwise, the continuous walking/running flag is expressed as "FALSE".

Figure 6:
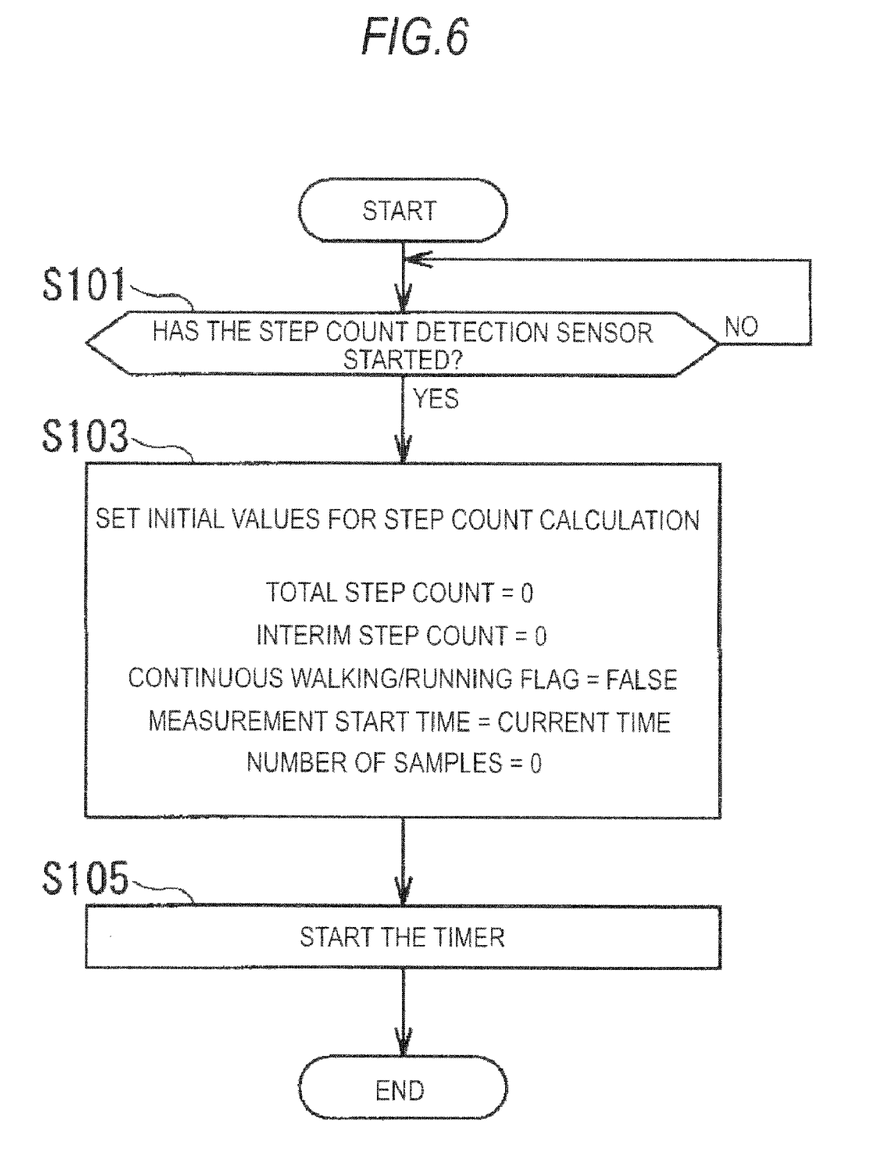
FIG. 6 is an exemplary flow chart showing a procedure of the step count calculation process in the mobile apparatus (mobile phone)
Figure 7:
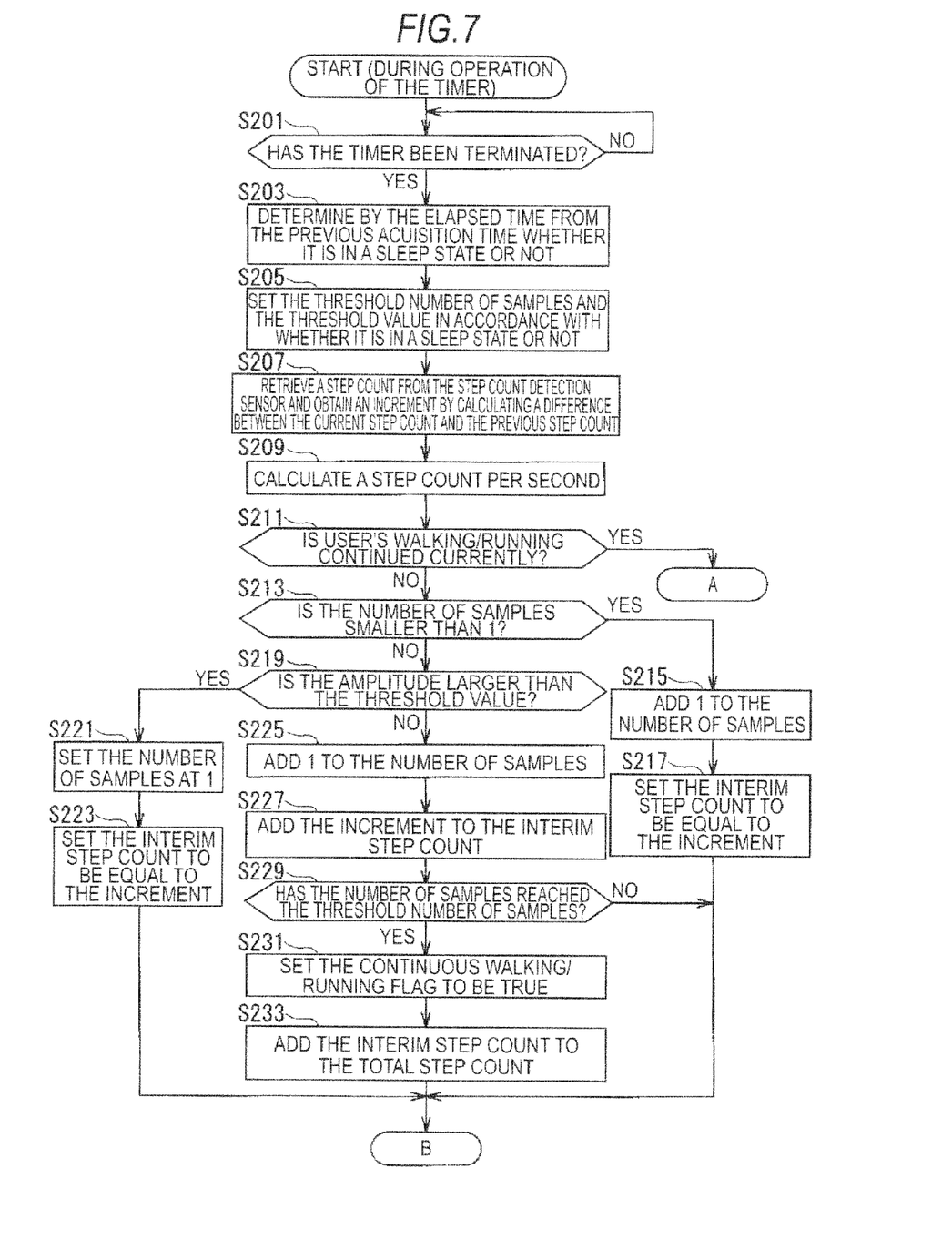
FIG. 7 is an exemplary flow chart showing a procedure of the step count calculation process in the mobile apparatus (mobile phone)
Figure 8:
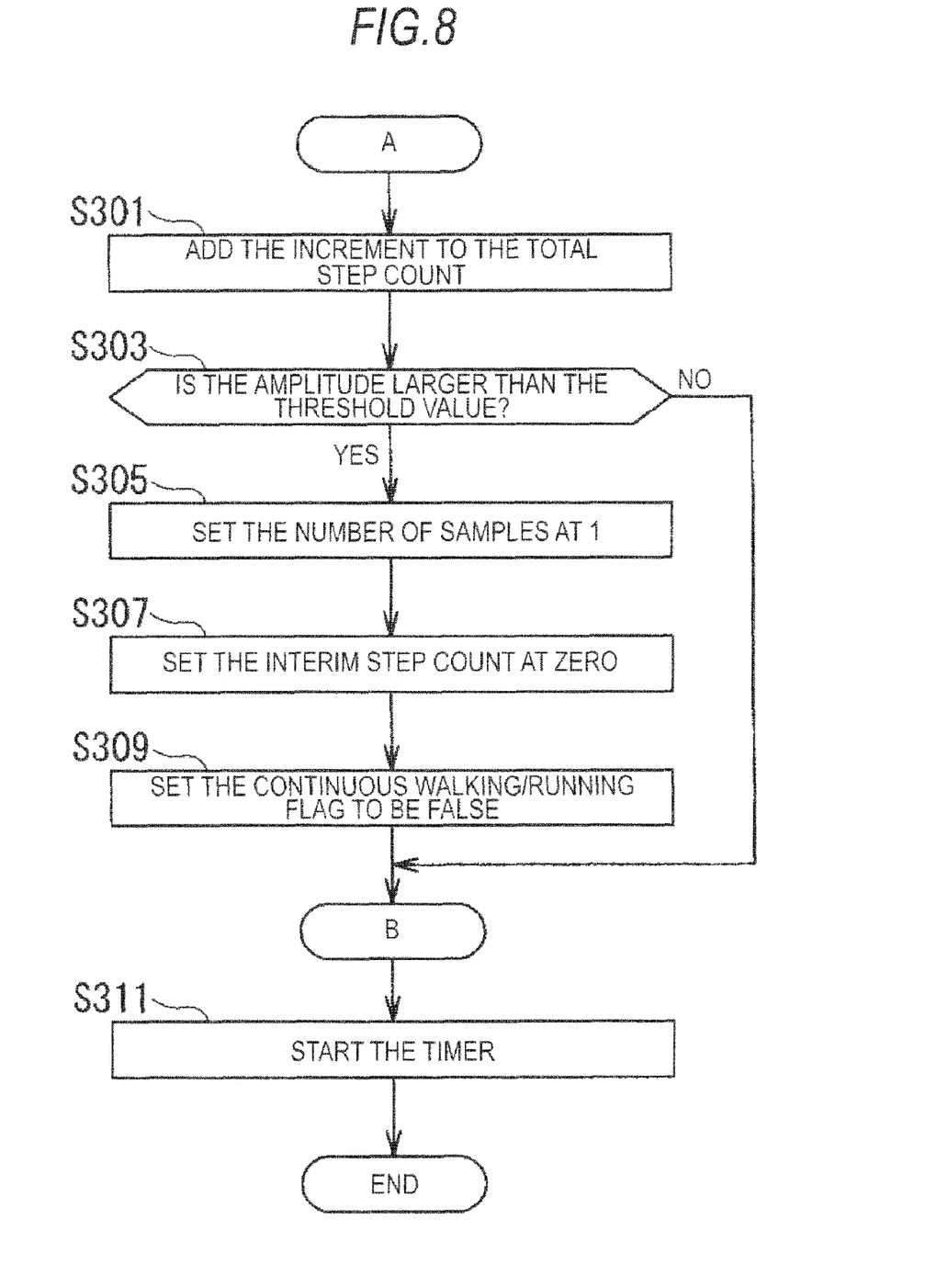
FIG. 8 is an exemplary flow chart showing a procedure of the step count calculation process in the mobile apparatus (mobile phone).

A procedure of the step count calculation process performed by the mobile phone 1 will be described with reference to FIGS. 6 to 8 which are flow charts thereof. Incidentally, the flow chart shown in FIG. 6 is a flow chart of an initialization process which is a part of the step count calculation process and which is performed by the step count calculation portion 27 at the time of starting the step count detection sensor 27a. The flow charts shown in FIGS. 7 and 8 are flow charts of a calculation process which is a part of the step count calculation process and which is performed by the step count calculation portion 27 for acquiring a detected step count value and calculating the number of steps due to user's continuous walking/running based on the detected step count value. In the following description, the term "step" will be abbreviated, for example, in such a manner that "step S101" is referred to as "S101".

A procedure of the initialization process performed by the step count calculation portion 27 at the time of starting the step count detection sensor 27a will be described first with reference to the flow chart shown in FIG. 6. The step count detection sensor 27a is started based on start of the mobile phone 1 or start of the pedometer function. The step count calculation portion 27 determines whether the step count detection sensor 27a has been started or not (S101). When the step count detection sensor 27a has not been started (No in S101), the step count calculation portion 27 stands by as it is.

When the step count detection sensor 27a has been started (Yes in S101), the step count calculation portion 27 sets initial values of parameters for calculating the number of steps (step count) (S103). At this time, the step count calculation portion 27 sets the total step count at "0", the interim step count at "0", the continuous walking/running flag at "FALSE", the measurement start time at the current time and the number of samples at "0". The step count calculation portion 27 starts a timer for a predetermined time (e.g. of 2 seconds) (S105). On this occasion, the step count calculation portion 27 sends a timer start signal to the timer portion 28. Upon reception of this signal, the timer portion 28 starts the timer and sends a timer end signal to the step count calculation portion 27 based on the lapse of the time (e.g. of 2 seconds).

In this manner, when the pedometer function is started, the mobile phone 1 sets initial values of parameters necessary to calculate the actually detected number of steps due to user's continuous walking/running based on the detected step count value detected by the step count detection sensor 27a and starts the timer as a turning point of access to the step count detection sensor 27a.

A procedure of the calculation process performed by the step count calculation portion 27 for calculating the number of steps due to user's continuous walking/running based on the detected step count value will be described below with reference to the flow charts shown in FIGS. 7 and 8. The step count calculation portion 27 determines whether the timer started in the step S105 has been terminated or not (S201). At this time, the step count calculation portion 27 determines that the timer has been terminated, for example, based on reception of a timer end signal from the timer portion 28. When the timer has not been terminated (No in S201), the step count calculation portion 27 waits for termination of the timer.

When the timer has been terminated (Yes in S201), the step count calculation portion 27 determines whether the mobile phone 1 is in a sleep state or not, by using the elapsed time from the previous detected step count value acquisition time (S203). That is, if the timer is started when the mobile phone 1 is in a sleep state, termination of the timer is apt to be delayed. The step count calculation portion 27 uses this phenomenon for determining that the mobile phone 1 is in a sleep state when the elapsed time from acquisition of the previous detected step count value and start of the timer for a predetermined time to the current time is larger than the predetermined time by a value or more. For example, when the timer for 2 seconds which has been started in the step S105 is terminated with a delay of 1 second or more, that is, when the elapsed time is not smaller than 3 seconds, the step count calculation portion 27 regards the mobile phone 1 as being in a sleep state.

The step count calculation portion 27 sets the threshold number of samples and the threshold value (S205) based on a result of the determination in the step S203. At this time, when, for example, the step S203 results in that the mobile phone 1 is not in a sleep state, the step count calculation portion 27 sets the threshold number of samples at "3" and the threshold value at "0.9". On the other hand, when, for example, the step S203 results in that the mobile phone 1 is in a sleep state, the step count calculation portion 27 sets the threshold number of samples at "2" and the threshold value at "1.3".

The step count calculation portion 27 acquires a detected step count value from the step count detection sensor 27a and calculates a difference between the currently acquired detected step count value and the previously acquired detected step count value to thereby obtain a step count increment (S207). When, for example, the previous detected step count value is 50 and the current detected step count value is 54, the step count increment is "4". In the following description, this step count increment is regarded as a detected step count value.

The step count calculation portion 27 calculates the number of steps per second (S209) by using the elapsed time from the previous acquisition time to the current time (or a predetermined time set in the timer) and the step count increment obtained in the step S207.

The step count calculation portion 27 determines whether user's walking/running is currently continued or not (S211). At this time, when the detected step count value within the threshold value set in the step S205 is continued by the number of times not smaller than the threshold number of samples set in the step S205, the step count calculation portion 27 regards user's walking/running as being continued.

When user's walking/running is currently continued (Yes in S211), the step count calculation portion 27 regards the step count increment obtained in the step S207 as being an increment due to user's continuous walking/running and adds the step count increment to the total step count (S301).

The step count calculation portion 27 determines whether the difference between the current detected step count value and the previous detected step count value is larger than the threshold value or not (S303). When the difference is larger than the threshold value (Yes in S303), the step count calculation portion 27 regards the detected step count value (vibration) as being irregular, regards user's continuous walking/running as being stopped, and resets the number of samples to "1" (S305). Because user's continuous walking/running is regarded as being stopped, the step count calculation portion 27 sets the interim step count at "0" (S307). The step count calculation portion 27 further sets the continuous walking/running flag at "FALSE" (S309). Then, the step count calculation portion 27 restarts the timer (S311).

When the difference is not larger than the threshold value (No in S303), the step count calculation portion 27 regards the detected step count value (vibration) as being regular, regards user's walking/running as being continued, and holds the existing status without setting the number of samples, the interim step count and the continuous walking/running flag. Then, the step count calculation portion 27 restarts the timer (S311).

When user's continuous walking/running is currently stopped (No in S211), the step count calculation portion 27 determines whether the number of samples is smaller than 1 or not (S213). When the number of samples is smaller than 1 (Yes in S213), that is, when the number of samples is zero, the step count calculation portion 27 regards user's continuous walking/running as being not started yet because the detected step count value is acquired first after the start of the step count detection sensor 27a. Accordingly, the step count calculation portion 27 first adds 1 to the number of samples (S215). The step count calculation portion 27 further sets the interim step count to be equal to the step count increment acquired in the step S207 (S217). Then, the step count calculation portion 27 restarts the timer (S311).

When the number of samples is not smaller than 1 (No in S213), the step count calculation portion 27 determines whether the difference between the current detected step count value and the previous detected step count value is larger than the threshold value or not (S219). When the difference is larger than the threshold value (Yes in S219), the step count calculation portion 27 regards the detected step count value (vibration) as being irregular, regards user's continuous walking/running as being stopped, and sets the number of samples at "1" (S221). The step count calculation portion 27 further sets the interim step count to be equal to the step count increment acquired in the step S207 (S223). Then, the step count calculation portion 27 restarts the timer (S311).

When the difference is not larger than the threshold value (No in S219), the step count calculation portion 27 regards the detected step count value (vibration) as being regular, regards user's continuous walking/running as being possibly started, and adds 1 to the number of samples (S225). The step count calculation portion 27 further adds the step count increment acquired in the step S207 to the interim step count (S227).

The step count calculation portion 27 determines whether the number of samples increased by 1 in the step S225 has reached the threshold number of samples or not (S229). When the number of samples has reached the threshold number of samples (Yes in S229), the step count calculation portion 27 regards user's continuous walking/running as being started, and sets the continuous walking/running flag at "TRUE" (S231). The step count calculation portion 27 further adds the sum of the interim step count and the step count increment obtained in the step S227 to the total step count (S233). That is, because the interim step count is the number of steps in a state where it is not obvious that user's continuous walking/running has been started the interim step count is discarded while user's continuous walking/running is stopped obviously (i.e. while the difference is large) but the interim step count is added to the total step count at a stage that user's continuous walking/running is started. Then, the step count calculation portion 27 restarts the timer (S311).

When the number of samples has not reached the threshold number of samples (No in S229), the step count calculation portion 27 regards user's continuous walking/running as being possibly started but not determined yet, and holds the existing state without setting the continuous walking/running flag and the total step count. Then, the step count calculation portion 27 restarts the timer (S311).

The mobile phone 1 repeats the process of the steps S201 to S233 and the steps S301 to S311 to thereby continue the step count calculation process for calculating the number of steps only due to user's continuous walking/running while removing the number of steps detected due to other vibrations than user's continuous walking/running from the detected step count value detected by the step count detection sensor 27a.

In this manner, the mobile phone 1 acquires the detected step count value from the step count detection sensor 27a periodically. When the difference (range) between the previous number of steps per a threshold number of seconds (e.g. 1 second) and the current number of steps per the threshold number of seconds (e.g. 1 second) is not larger than a threshold value (threshold range), the mobile phone 1 regards user's continuous walking/running as being possibly performed. When a state in which the difference is not larger than the threshold value is continued by a threshold number of times (a threshold number of samples), the mobile phone 1 regards user's continuous walking/running as being performed, and adds the step count at this time to the total step count. Even when user's continuous walking/running is regarded as being performed, the determination as to whether the difference is larger than the threshold value or not, is performed whenever the detected step count value is acquired from the step count detection sensor 27a. When the difference becomes larger than the threshold value, the mobile phone 1 regards user's continuous walking/running as being stopped, and does not add the step count at this time to the total step count. Then, the mobile phone 1 does not add to the total step count until user's continuous walking/running is regarded again as being performed.

Although the mobile phone 1 makes access to the step count detection sensor 27a based on a periodic timer, there is a possibility that termination of the timer may be delayed when the mobile phone 1 (CPU) is in a sleep state. When the timer is delayed, the mobile phone 1 therefore regards the CPU as being in a sleep state, and performs setting so that the number of samples for determining whether user's continuous walking/running is performed or not is smaller than that in a non-sleep state while the threshold value is larger than that in a non-sleep state. As a result, in the mobile phone 1, prevention of miscounting in a sleep state of the CPU and power saving based on reduction in frequency of access to the step count detection sensor 27a can be achieved simultaneously.

The mobile phone 1 according to the invention is equipped with a pedometer function and can determine based on regularity of vibration whether each vibration is due to user's walking/running or not, and can integrate only vibrations due to user's walking/running as the total step count to thereby accurately calculate the number of steps due to user's walking/running while preventing the pedometer function from miscounting.

The mobile phone 1 according to the invention is equipped with a pedometer function and can attain power saving of the mobile phone 1, for example, by reduction in frequency of access to the step count detection sensor 27a when the terminal is not operated by the user.

Although the mobile phone 1 has been taken as an example for description of the invention, the invention is not limited thereto. For example, any mobile apparatus such as a Personal Handyphone System (PHS), a Personal Digital Assistants (PDA), a portable audio player, a portable video camera, a portable game machine, etc. may be used as long as the mobile apparatus has a voice call function or a mail transmission/reception function.

What is claimed is:

1. A mobile apparatus comprising:
a vibration sensor;
a timer which generates a signal when a timer value elapses; and
a step counting module which (i) obtains a count value based on an output from the vibration sensor each time that the signal is received from the timer, (ii) compares the count value with a predetermined condition, (iii) calculates a tentative step count value by adding consecutively obtained count values that satisfy the predetermined condition, until a predetermined number of consecutively obtained count values have satisfied the predetermined condition, and (iv) determines that the tentative step count value has been obtained based on continued walking or running, and adds the tentative step count value to a step count value when the predetermined number of consecutively obtained count values have satisfied the predetermined condition.

2. The mobile apparatus according to claim 1, wherein the step counting module compares the count value with the predetermined condition by determining whether the count value is in a range obtained by adding a threshold to a most recently obtained count value and subtracting the threshold from the most recently obtained count value.

3. The mobile apparatus according to claim 1, further comprising:
a detector which detects whether the mobile apparatus is in a sleep state or not;
wherein the step counting module compares the count value with the predetermined condition by determining whether the count value is in a range obtained by adding a first threshold to a most recently obtained count value and subtracting the first threshold from the most recently obtained count value, if the detector detects that the mobile apparatus is not in the sleep state;
wherein the step counting module compares the count value with the predetermined condition by determining whether the count value is in a range obtained by adding a second threshold to a most recently obtained count value and subtracting the second threshold from the most recently obtained count value, if the detector detects that the mobile apparatus is in the sleep state; and
wherein the second threshold is larger than the first threshold.

4. The mobile apparatus according to claim 3, wherein the predetermined number of consecutively obtained count values is a first number if the detector detects that the mobile apparatus is not in the sleep state;
wherein the predetermined number of consecutively obtained count values is a second number if the detector detects that the mobile apparatus is in the sleep state; and
wherein the second number is smaller than the first number.

5. The mobile apparatus according to claim 1, wherein the mobile apparatus comprises a mobile phone, and
wherein the step counting module compares the count value with the predetermined condition so as to avoid incrementing the step count with a count value influenced by a vibration due to a key operation of the mobile phone.

6. A mobile apparatus comprising:
a vibration sensor;
means for generating a signal when a timer value elapses;
means for obtaining a count value based on an output from the vibration sensor each time that the signal is received from the timer;
means for comparing the count value with a predetermined condition;
means for calculating a tentative step count value by adding consecutively obtained count values that satisfy the predetermined condition, until a predetermined number of consecutively obtained count values have satisfied the predetermined condition; and
means for determining that the tentative step count value has been obtained based on continued walking or running and for adding the tentative step count value to a step count value, when the predetermined number of consecutively obtained count values have satisfied the predetermined condition.

7. The mobile apparatus according to claim 6, wherein the comparing means compares the count value with the predetermined condition by determining whether the count value is in a range obtained by adding a threshold to a most recently obtained count value and subtracting the threshold from the most recently obtained count value.

8. The mobile apparatus according to claim 6, further comprising:
   means for detecting whether the mobile apparatus is in a sleep state or not;
   wherein the comparing means compares the count value with the predetermined condition by determining whether the count value is in a range obtained by adding a first threshold to a most recently obtained count value and subtracting the first threshold from the most recently obtained count value, if the detecting means detects that the mobile apparatus is not in the sleep state;
   wherein the comparing means compares the count value with the predetermined condition by determining whether the count value is in a range obtained by adding a second threshold to a most recently obtained count value and subtracting the second threshold from the most recently obtained count value, if the detecting means detects that the mobile apparatus is in the sleep state; and
   wherein the second threshold is larger than the first threshold.

9. The mobile apparatus according to claim 6, wherein the predetermined number of consecutively obtained count values is a first number if the detecting means detects that the mobile apparatus is not in the sleep state;
   wherein the predetermined number of consecutively obtained count values is a second number if the detecting means detects that the mobile apparatus is in the sleep state; and
   wherein the second number is smaller than the first number.

10. The mobile apparatus according to claim 6, wherein the mobile apparatus comprises a mobile phone, and
    wherein the comparing means compares the count value with the predetermined condition so as to avoid incrementing the step count with a count value influenced by a vibration due to a key operation of the mobile phone.

11. A non-transitory computer readable recording medium having a computer program stored thereon that is executable by a computer of a mobile apparatus comprising a vibration sensor to control the mobile apparatus to perform functions comprising
    generating a signal when a timer value elapses;
    obtaining a count value based on an output from the vibration sensor each time that the signal is received from the timer;
    comparing the count value with a predetermined condition;
    calculating a tentative step count value by adding consecutively obtained count values that satisfy the predetermined condition, until a predetermined number of consecutively obtained count values have satisfied the predetermined condition; and
    determining that the tentative step count value has been obtained based on continued walking or running, and adding the tentative step count value to a step count value, when the predetermined number of consecutively obtained count values have satisfied the predetermined condition.

12. The non-transitory computer readable recording medium according to claim 11, wherein the count value is compared with the predetermined condition by determining whether the count value is in a range obtained by adding a threshold to a most recently obtained count value and subtracting the threshold from the most recently obtained count value.

13. The non-transitory computer readable recording medium according to claim 11, wherein the functions further comprise:
    detecting whether the mobile apparatus is in a sleep state or not;
    wherein the count value is compared with the predetermined condition by determining whether the count value is in a range obtained by adding a first threshold to a most recently obtained count value and subtracting the first threshold from the most recently obtained count value, if it is detected that the mobile apparatus is not in the sleep state;
    wherein the count value is compared with the predetermined condition by determining whether the count value is in a range obtained by adding a second threshold to a most recently obtained count value and subtracting the second threshold from the most recently obtained count value, if it is detected that the mobile apparatus is in the sleep state; and
    wherein the second threshold is larger than the first threshold.

14. The non-transitory computer readable recording medium according to claim 11, wherein the predetermined number of consecutively obtained count values is a first number if it is detected that the mobile apparatus is not in the sleep state;
    wherein the predetermined number of consecutively obtained count values is a second number if it is detected that the mobile apparatus is in the sleep state; and
    wherein the second number is smaller than the first number.

15. The non-transitory computer readable recording medium according to claim 11, wherein the mobile apparatus comprises a mobile phone, and
    wherein the count value is compared with the predetermined condition so as to avoid incrementing the step count with a count value influenced by a vibration due to a key operation of the mobile phone.

* * * * *